United States Patent
Lacy

(10) Patent No.: US 8,330,116 B2
(45) Date of Patent: Dec. 11, 2012

(54) LONG RANGE NEUTRON-GAMMA POINT SOURCE DETECTION AND IMAGING USING ROTATING DETECTOR

(75) Inventor: Jeffrey L. Lacy, Houston, TX (US)

(73) Assignee: Proportional Technologies, Inc., Houston, TX (US)

( * ) Notice: Subject to any disclaimer, the term of this patent is extended or adjusted under 35 U.S.C. 154(b) by 653 days.

(21) Appl. No.: 12/483,771

(22) Filed: Jun. 12, 2009

(65) Prior Publication Data

US 2010/0163744 A1 Jul. 1, 2010

Related U.S. Application Data

(60) Provisional application No. 61/061,911, filed on Jun. 16, 2008.

(51) Int. Cl.
*G01T 3/00* (2006.01)

(52) U.S. Cl. .................................. 250/390.02

(58) Field of Classification Search ............. 250/390.02
See application file for complete search history.

(56) References Cited

U.S. PATENT DOCUMENTS

| | | | |
|---|---|---|---|
| 3,483,377 A | 12/1969 | Borkowski et al. | |
| 4,172,226 A * | 10/1979 | Rubin | 250/394 |
| 4,359,372 A | 11/1982 | Nagai et al. | |
| 4,404,164 A | 9/1983 | Kopp et al. | |
| 4,695,476 A | 9/1987 | Field, Jr. | |
| 5,151,601 A | 9/1992 | Regimand | |
| 5,434,415 A | 7/1995 | Terada et al. | |
| 5,573,747 A | 11/1996 | Lacy | |
| 6,078,039 A | 6/2000 | Lacy | |
| 6,264,597 B1 | 7/2001 | Lacy | |
| 6,426,504 B1 | 7/2002 | Menlove | |
| 6,483,114 B1 | 11/2002 | Lacy | |
| 6,486,468 B1 | 11/2002 | Lacy | |
| 7,002,159 B2 | 2/2006 | Lacy | |
| 7,078,704 B2 | 7/2006 | Lacy et al. | |
| 2007/0018110 A1 | 1/2007 | McGregor et al. | |
| 2007/0029490 A1 * | 2/2007 | Ronaldson et al. | 250/363.09 |
| 2009/0074128 A1 | 3/2009 | Bertozzi | |

FOREIGN PATENT DOCUMENTS

EP 0204565 A 12/1986

OTHER PUBLICATIONS

Sun, L. et al., "A Positron Emission Mammography System Based on 4 mm Straw Detectors," IEEE 2007 Nuclear Science Symposium Conf. Record, Oct. 26-Nov. 3, pp. 3337-3344, vol. 5.

(Continued)

*Primary Examiner* — David Porta
*Assistant Examiner* — Shun Lee
(74) *Attorney, Agent, or Firm* — Gregory M. Hasley; Akin Gump Strauss Hauer & Feld LLP

(57) ABSTRACT

This application relates to radiation detection, and more particularly, to a method and device for the remote detection and localization of nuclear materials in an unknown background. A method and apparatus for long range neutron and gamma ray detection and imaging is disclosed wherein a panel of thin walled tube detectors are rotated to enhance detection performance. The method and apparatus have particular applicability to portable monitoring and homeland security.

21 Claims, 8 Drawing Sheets

OTHER PUBLICATIONS

Shehad, N.M. et al., "Small Animal PET Camera Design Based on 2-mm Straw Detectors," IEEE 2006 Nuclear Science Symposium Conference Record, Oct. 29-Nov. 1, pp. 2462-2468, vol. 4.

Shehad, N.M. et al., "Novel Lead-Walled Straw PET Detector for Specialized Imaging Applications," IEEE 2005 Nuclear Science Symp. Conf. Rec., Oct. 23-29, pp. 2895-2898, vol. 5.

Shehad, N.M et al., "Ultra-High Resolution PET Detector Using Lead Walled Straws," IEEE 2002 Nuclear cience Symposium Conference Record, Nov. 10-16, pp. 1839-1843, vol. 3.

Lacy, J.L. et al., "Long range neutron-gamma point source detection and imaging using unique rotating detector," IEEE 2007 Nuclear Science Symp. Conf. Rec., p. 185-191, vol. 1.

Athanasiades, A. et al., "High Sensitivity Portable Neutron Detector for Fissile Materials," IEEE 2005 Nuclear Science Symposium Conf. Record, Oct. 23-29, pp. 1009-1013, vol. 2.

Lacy, J.L. et al., "Performance of 1 Meter Straw Detector for High Rate Neutron Imaging," IEEE 2006 Nuclear Science Symposium Conference Record, Oct. 29-Nov. 1, pp. 20-26, vol. 1.

Athanasiades, A. et al., "Straw Detector for High Rate, High Resolution Neutron Imaging", IEEE 2005 Nuclear Science Symposium Conference Record, Oct. 23-29, pp. 623-627, vol. 2.

Lacy, J.L. et al., "Novel Neutron Detector for High Rate Imaging Applications", IEEE 2002 Nuclear Science Symposium Conference Record, Nov. 10-16, pp. 392-396, vol. 1.

Pascual, E., et al. "Boron Carbide Thin Films Deposited by Tuned-Substrate RF Magnetron Sputtering," Diamond and Related Materials, Mar. 1999, pp. 402-405, vol. 8, Amsterdam.

Sharma A. "Properties of Some Gas Mixtures Used in Tracking Detectors." SLAC Journal ICFA 16-3, Jul. 2, 1998.

* cited by examiner

LONG RANGE NEUTRON-GAMMA POINT SOURCE DETECTION AND IMAGING USING ROTATING DETECTOR

CROSS-REFERENCE TO RELATED APPLICATIONS

This application claims the benefit of U.S. Provisional Application No. 61/061,911 filed Jun. 16, 2008, which is incorporated herein by reference in its entirety for all purposes.

STATEMENTS REGARDING FEDERALLY SPONSORED RESEARCH OR DEVELOPMENT

The U.S. Government has a paid-up license in this invention and the right in limited circumstances to require the patent owner to license others on reasonable terms as provided by for the terms of DTRA01-02-D0067 awarded by the Defense Threat Reduction Agency.

REFERENCE TO A MICROFICHE APPENDIX

Not Applicable.

BACKGROUND OF THE INVENTION

1. Field of the Invention

This invention relates to radiation detection. More particularly, the invention relates to a method and device for long-range, passive detection and localization of fissile material, with some particular applications in homeland security.

2. Description of the Related Art

The background to the present invention and related art is best understood by reference to Applicant's own prior work, including in particularly, U.S. Pat. No. 7,002,159 B2 (the '159) entitled "Boron Coated Straw Neutron Detector" which issued Feb. 21, 2006. The '159 patent is hereby incorporated by reference in its entirety, for all purposes, including, but not limited to, supplying background and enabling those skilled in the art to understand, make and use in Applicant's present invention.

Applicant's other issued patents and pending applications may also be relevant, including; (1) U.S. Pat. No. 5,573,747 entitled, "Method for Preparing a Physiological Isotonic Pet Radiopharmaceutical of $^{62}CU$; (2) U.S. Pat. No. 6,078,039 entitled, "Segmental Tube Array High Pressure Gas Proportional Detector for Nuclear Medicine Imaging"; (3) U.S. Pat. No. 6,264,597 entitled, "Intravascular Radiotherapy Employing a Safe Liquid Suspended Short-Lived Source"; (4) U.S. Pat. No. 6,483,114 D1 entitled, "Positron Camera"; (5) U.S. Pat. No. 6,486,468 entitled, "High Resolution, High Pressure Xenon Gamma Rays Spectroscopy Using Primary and Stimulated Light Emissions; (6) U.S. Pat. No. 7,078,704 entitled, "Cylindrical Ionization Detector with a Resistive Cathode and External Readout; (7) U.S. patent application Ser. No. 10/571,202, entitled, "Miniaturized $^{62}Zn/^{62}CU$ Generator for High Concentration and Clinical Deliveries of $^{62}CU$ Kit Formulation for the Facile Preparation of Radiolabeled Cu-bis(thiosemicarbazone) Compound." Each of these listed patents are hereby incorporated by reference in their entirety for all purposes.

There has been increasing interest in detecting nuclear materials for many years, especially since Sep. 11, 2001. Nuclear detection often uses neutron detection because neutrons can readily penetrate most materials. A common neutron detector is a tube of helium-3 ($^3He$) gas linked to a power supply, with positively and negatively-charged plates or wires in the tubes. When a low-energy neutron passes through the tube, a helium-3 atom absorbs it, producing energetic charged particles that lose their energy by knocking electrons off other helium-3 atoms. Current neutron detectors, such as those using $^3He$ tubes, have significant practical limitations, including high cost and substantial weight and bulkiness, and are dangerous in portable use due to the high pressure required. Additionally, helium-3 is scarce and it is thought there may not be enough available to support large scale use of these type tubes. Therefore, a compelling need has emerged for alternative detectors with more favorable characteristics.

BRIEF SUMMARY OF THE INVENTION

The present invention comprises an improved method and apparatus for radiation detection. More particularly, a technique is presented for passive, long-range detection and localization of gamma and/or neutron emitting sources, that differentiates it from background noise. Preferably, the present invention offers high sensitivity to both gamma rays and neutrons, and can be applied cost effectively, to survey monitoring. Applications of the present invention can include, but are not limited to, portable monitors and neutron imaging.

In one embodiment of the present invention, a panel of detectors is rotatable about an axis while in use thereby significantly improving detector performance. Other embodiments include stationary panels having detectors arranged in a helical configuration. The various embodiments of the present invention detect the unique signature of a point source and differentiate that from background noise.

One method of detecting radiation sources of the present invention involves rotating a panel of detectors around an axis while neutron and/or gamma counts are recorded at intervals. The rotating panel's angular response (counts vs. rotation angle) exhibits a shape that is then processed using an algorithm that enhances sensitivity to deduce the source size and direction.

The various embodiments of the present invention may have certain of the following advantages when compared with conventional $^3He$-based neutron detectors: 1) sensitivity to both neutrons and gammas, 2) low weight, 3) safety for portable use (no pressurization), 4) low price. In particular, the straw array has the linear stopping power of $^3He$ gas at a pressure of 2.68 atm, for thermal neutrons. It is difficult to achieve this pressure safely in portable detectors of the dimension required for long range detection. A similar gamma source detection technique has been applied in stationary portal monitors, where potential sources travel past the detector.

Applicant's invention was originally described in "Long-range Neutron-Gamma Point Source Detection and Imaging Using Unique Rotating Detector," J L Lacy et al., *IEEE Nuclear Science Symposium and Medical Imaging Conference Record*, Vol. 1, October 2007, p. 185-191, which is hereby incorporated by reference in its entirety for all purposes.

DETAILED DESCRIPTION OF THE INVENTION

Figure 1:
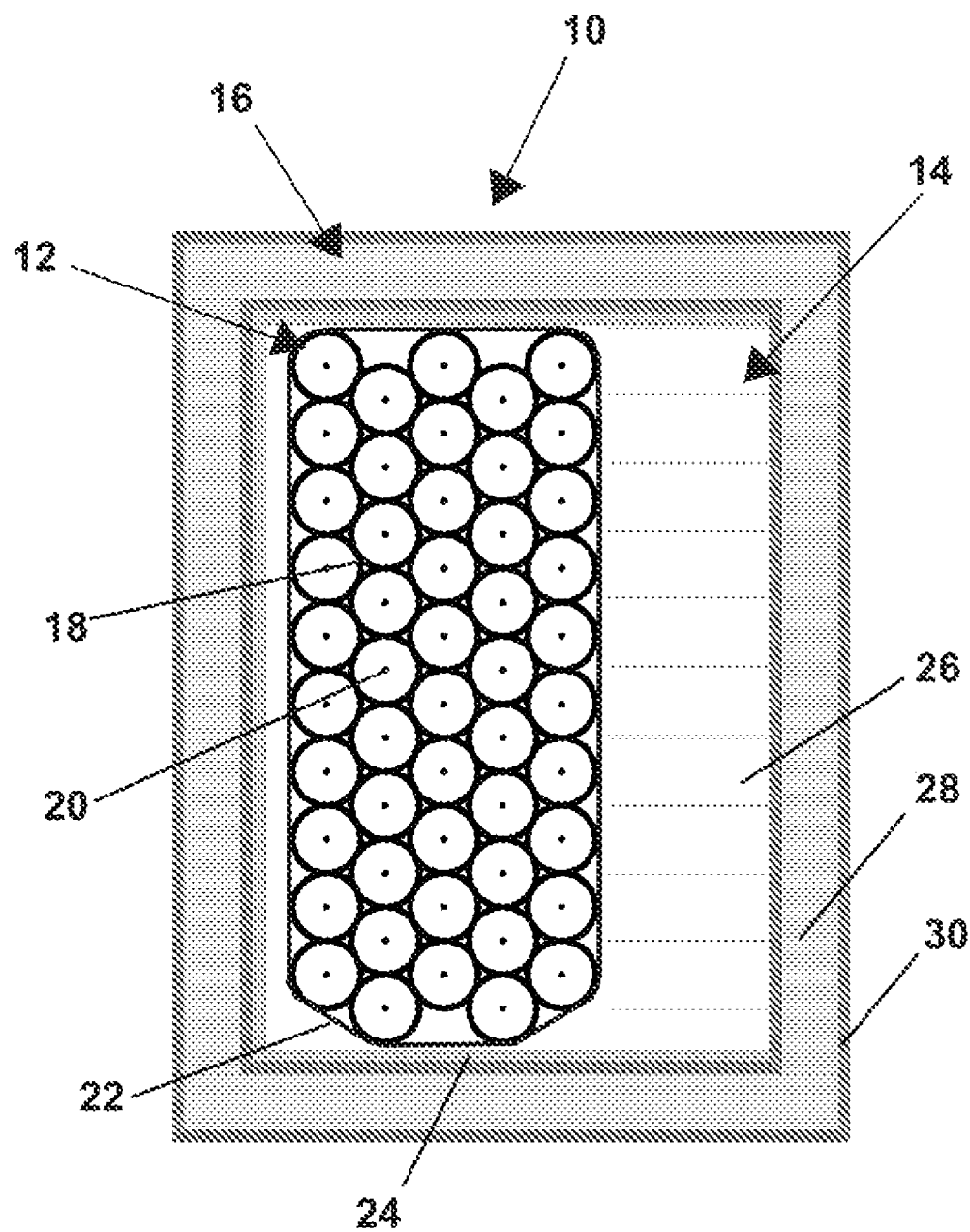
FIG. 1 is a cross-sectional view of the detector module.

Referring now to the preferred embodiment of the invention in more detail, in FIG. 1, an embodiment of a detector module 10 is shown, comprising a sealed detector core 12, a neutron collimator 14, and a housing 16. The sealed detector core 12 consists of a close-packed array of many small-diameter, thin-walled tubes 18, also called "straws".

Tubes 18 are preferably copper, preferably about 1 m in length, and lined with a very thin (preferably ~1 μm) coating of enriched boron, for example, boron carbide ($^{10}B_4C$). A fine metallic wire 20 is tensioned in the center of each tube 18. The array of tubes 18 is hermetically sealed, preferably with the use of high purity copper foil 22, tightly wrapped around the array of copper tubes 18. A gas mixture is sealed within the space enclosed by the copper foil 22, and in the space within and in between the tubes 18.

Thin sheets 24, preferably comprising borated aluminum, are installed on five sides of the detector core 12. A neutron collimator 14 is positioned in front of one side of the sealed detector core 12 that is without a sheet 24. The neutron collimator 14 preferably comprises short aluminum tubes 26, of the same or similar diameter as tubes 20, oriented with their central axis proximately normal to the central axis of the tubes 20. The tubes 26 are preferably spray-coated with enriched boron-carbide ($^{10}B_4C$) for neutron absorption.

Both the sealed detector core 12, and the neutron collimator 14, are enclosed within a housing 16, preferably made from structural foam 28 sandwiched between thin carbon fiber composite sheets 30. Other housing configurations can also be used.

As shown in FIG. 1, the housing 16 is preferably made of structural foam 28 sandwiched between carbon fiber composite sheets 30, but any other structural materials such as would be known by a persons of skill in the art that are lightweight and rigid, and do not have a high stopping power for gamma rays can be used. Aluminum is one other example of such housing material.

The thermal neutron shielding material surrounding all sides but one of the detector core 12 is preferably made of borated aluminum sheets 24, but any lightweight material that absorbs thermal neutrons can be used instead, such as plain aluminum sheets that have been painted with borated paint.

The thermal neutron collimator 14 shown in FIG. 1 is preferably made of a close-packed array of aluminum tubes 26, spray-coated with enriched boron carbide ($^{10}B_4C$), but any lightweight structure that can provide thermal neutron collimation can be used instead, such as aluminum honeycomb core, incorporating thermal neuron absorber material.

The detector core 12 is preferably made of an array of thin walled tube detectors, a novel design for which a patent has been awarded (U.S. Pat. No. 7,002,159, Feb. 21, 2006). Other detector technologies that can detect both neutrons and gamma rays, can distinguish between the two radiations, are lightweight, safe and robust for field use, can be configured into a panel with a large sensitive area, such that the panel has a variable angular response to neutron and gamma ray radiation, can be substituted instead.

The detector module 10 of FIG. 1 can detect gamma rays incident anywhere on its sides. Gamma rays are converted in the wall of the copper tubes 18. Electrons generated from gamma-ray interactions escape the tube wall and ionize the counting gas mixture contained inside each tube. This ionization is collected to the thin central anode wire 20 where avalanche amplification occurs. Electrical signals propagated in the anode wire 20 are read with appropriately designed amplifiers.

The detector module 10 of FIG. 1 additionally detects thermal neutrons incident primarily on the front face of the detector module 10, where the neutron collimator 14 is installed. Thermal neutrons incident on other sides are absorbed by the borated aluminum sheets 24, and thus do not reach the detector core 12. Additionally, thermal neutrons that hit the neutron collimator walls 14 are absorbed and never reach the detector core 12. Thermal neutrons must have an angle of incidence that allows them to pass through the neutron collimator 14, without being absorbed in its walls, in order to reach the detector core 12.

Thermal neutrons that do reach the detector core 12 are converted in the $^{10}$B material incorporated within the wall of the copper tubes 18. Atomic fragments generated from neutron interactions escape the tube wall and ionize the counting gas mixture contained inside each tube. This ionization is again collected to the thin central anode wire 20 where avalanche amplification occurs. Electrical signals propagated in the anode wire 20 are read with appropriately designed amplifiers.

Figure 2:
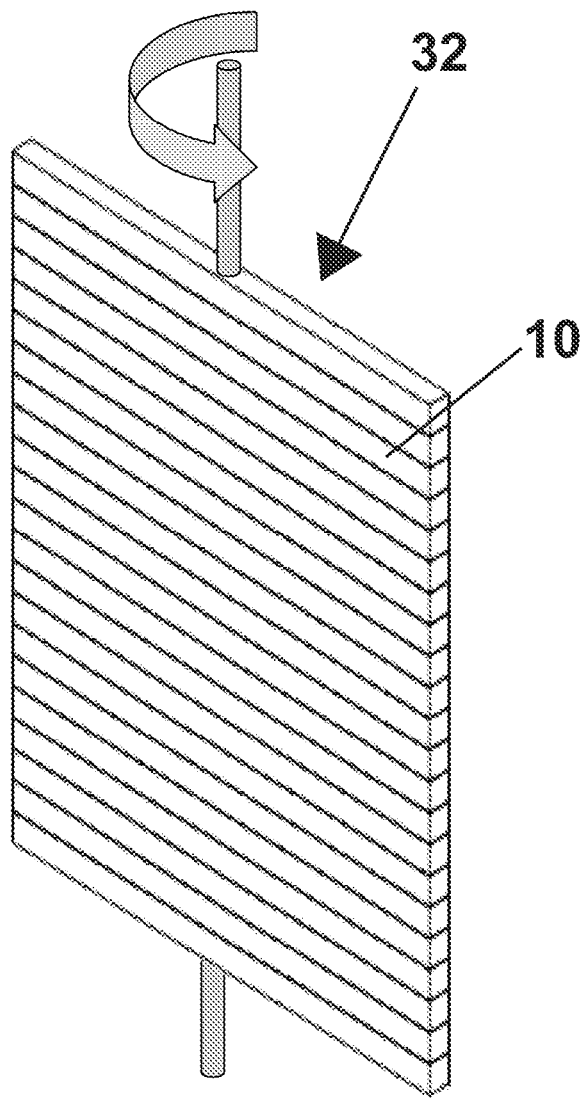
FIG. 2 is a perspective view of an embodiment of a rotating panel monitor of the present invention.
Figure 2A:
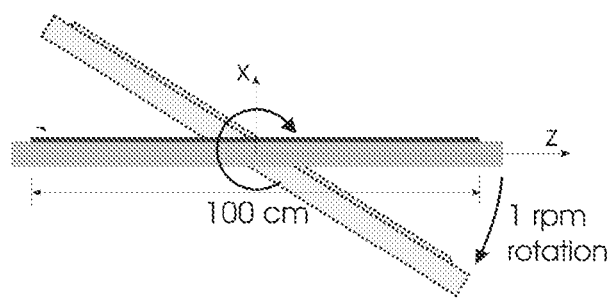
FIG. 2a is a top view of an embodiment of a rotating panel monitor of the present invention.

A large number of detector modules 10, can be stacked on top of another to make a large panel monitor 32, such as shown in FIG. 2. Preferably, each tube detector is about 1 m in length and about 4 mm in diameter. The tube detectors are preferably grouped in closely packed arrays forming detector modules of about 50 tube detectors. Preferably detector modules are stacked one deep to form a 100 cm×100 cm panel detector.

The panel monitor 32 is allowed to rotate around a vertical axis, preferably through its center, as indicated in FIG. 2. Preferably, the panel monitor is rotated at a rate of about 1 revolution per minute. While the panel monitor 32 rotates, neutron and gamma-ray counts are recorded, preferably at 1 second intervals.

Electrical signals generated in the tube detectors are read out preferably in pulse mode, using preamplifiers directly connected to the anode wires 20. Preferably, all wires 20 within a single module 10 are electrically connected together and to a single preamplifier. Thus a number of preamplifiers equal to the number of modules comprising the panel monitor 32 is preferred to read the entire panel monitor 32. The preamplifier circuit is preferably of a type known as the charge-sensitive configuration. For this configuration, the output of the preamplifier is a distinct pulse, corresponding to a single quantum of radiation (neutron or gamma), with an amplitude proportional to the ionization energy deposited in the gas within the tube detector. The output of the preamplifier is processed in a manner common to radiation detection, preferably with an analogue shaper, that shapes and amplifies the signal, and a discriminator. A digital counter or other suitable device can be connected to the output of the discriminator and used to count the number of pulses generated inside the detector.

If nuclear material that emits neutrons, or gamma-rays, or both, is present within a specified distance from the panel monitor 32; and if that material is small in spatial extent, relative to the distance between the material and the panel monitor 32; and if the count rates due to the natural neutron and gamma-ray background are uniform over all scanning directions; then the number of gamma-ray counts, or neutron counts, recorded at each scanning angle, and plotted versus scanning angle, generate the angular response of the panel monitor 32. This angular response is of sinusoidal shape, with a peak in the direction of the nuclear material, and a valley in the direction normal to that of the nuclear material. The angular response of the panel monitor 32 can be used in an algorithm that improves its detection capability, over what would be possible by a standard statistical decision process. Moreover, the algorithm can determine the direction along which the suspect source is located.

Specifically for the case of gamma rays, assuming that the count rate in the rotating panel monitor 32 is recorded every second, and that data are averaged over the two half-rotations, there are N=30 data points $(\theta_i, y_i)$, where $\theta_i$ is the rotation angle (0 to 180 degrees), and $y_i$ is the measured gamma count rate, with i taking integer values from 1 to 30. The algorithm aims to estimate the component of $y_i$ that is due to the gamma ray background, and the component that is due to a gamma point source that may be present. In addition, it aims to identify the source direction. In order to achieve these objectives, it first assumes that the data $y_i$ equal an analytical expression $f_i$, such that $y_i=f_i$, and that $$f_i = (\text{net signal})_i + (\text{background})_i \quad (1)$$

It can be shown that $$f_i = a \cdot yt_i / \Sigma(yt_i) + (\Sigma(y_i) - a) \cdot (1/30), \quad (2)$$

where $yt_i = yt_1(\theta_i + b)$ is the known net angular response of the detector, for each angle $\theta_i + b$. Constants a and b need to be determined next. To do that, the algorithm computes and then minimizes the $\chi^2$ function, written as $$\chi^2 = \Sigma(y_i - f_i(\theta_i, a, b))^2 / y_i \text{ for } i=1 \text{ to } 30 \quad (3)$$

Once $a_0$ and $b_0$ for which $\chi^2(a_0, b_0) = \min(\chi^2)$ are obtained, then the following quantities can be evaluated, using (2):
the net signal (averaged over all angles) equals $a_0/30$;
the background rate equals $(\Sigma(y_i) - a_0)/30$;
and the source direction angle equals $b_0$.

The algorithm for the neutron counts follows the general development presented above for gamma rays, however, because neutron counts follow a Poisson rather than a normal distribution, the function minimized is the negative logarithm of the Likelihood Function, $$-\ln(L) = -\ln\left(\prod e^{-f_i} \cdot f_i^{y_i} / y_i!\right)$$
$$= \sum f_i - \sum y_i \ln(f_i) + \ln\left(\prod y_i!\right)$$

In further detail, referring to the invention of FIG. 2, the panel monitor 32 preferably has a large sensitive area for enhanced detection sensitivity, and low weight for portable use. In addition, it is preferably robust and safe for field use, requires low electrical power, and is inexpensive to manufacture. It is preferably sensitive to both neutrons and gamma-rays, and able to effectively discriminate gamma-ray counts from neutron counts. It preferably registers low count rates due to the naturally occurring neutron and gamma ray background (in the absence of a source). Finally, the panel monitor 32 preferably has an angular response to both neutrons and gamma rays that is sinusoidal in shape, or, in other words, have variable sensitivity as it rotates around a vertical axis through its center.

Figures 3A, 3B:
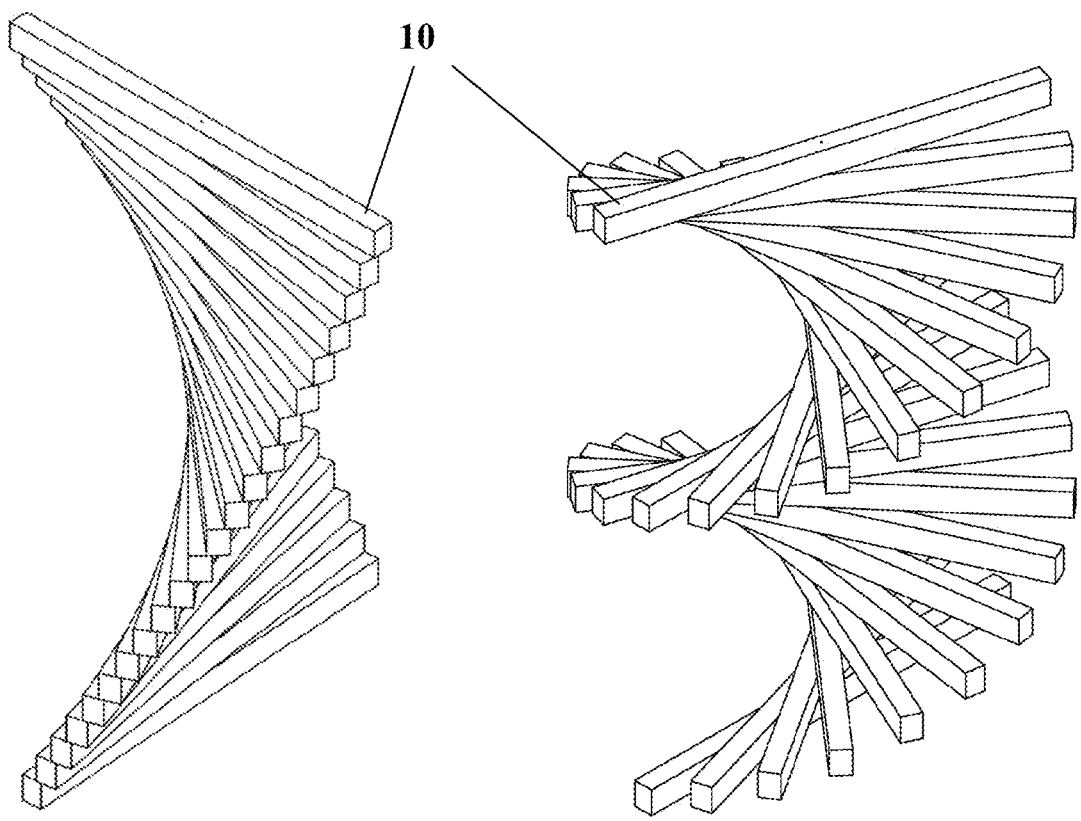
FIG. 3a is a perspective view of an alternate embodiment of the monitor of the present invention.
FIG. 3b is a perspective view of a second alternate embodiment of the monitor of the present invention.

The panel monitor 32 of FIG. 2 is preferably made of detector modules 10 aligned to form a flat surface, but detector modules 10 may also be arranged in helical patterns as shown in FIG. 3. In those patterns, the resulting monitors do not need to be rotated.

Applicant evaluated the source detection and localization algorithm with a prototype detector in accord with the present invention as described earlier. The prototype straws used natural rather than enriched boron, and had thus limited neutron detection efficiency. The size of the prototype was 40 cm×5 cm×5 cm, significantly smaller than the preferred square meter panel. The prototype detector consisted of 136 $B_4C$-lined copper straws each 40 cm long and 4 mm in diameter. The straw array was sealed inside a stainless steel housing, which was subsequently evacuated and filled with a gas mixture of 90% argon and 10% methane, at 1 atm. A 2 mm thick thermal neutron shield made of borated aluminum (4.5% boron, $^{10}B$-enriched to >95%) was installed on all sides of the housing, except the side where a collimator was fitted.

The neutron collimator was made up of aluminum straws, of the same diameter as the straws making up the detector module (4 mm), but only 10 mm in length. Collimation was achieved through neutron absorption in $^{10}B$-enriched boron carbide ($^{10}B_4C$), incorporated into the wall of each straw. Unlike the detector straws, the collimator straws incorporate a much thicker boron carbide coating, in order to efficiently collimate incident neutrons.

The monitor was read out with a single charge sensitive amplifier (all straw wires were connected together), shaper and discriminator, all sealed inside the detector housing, and an external, dual counter, that incorporated a digital display and control buttons. A built-in high voltage supply biased the straw wires (anode) to 1000 V. A 9 V rechargeable lithium-ion battery powered all electronics and the detector.

Figure 4:
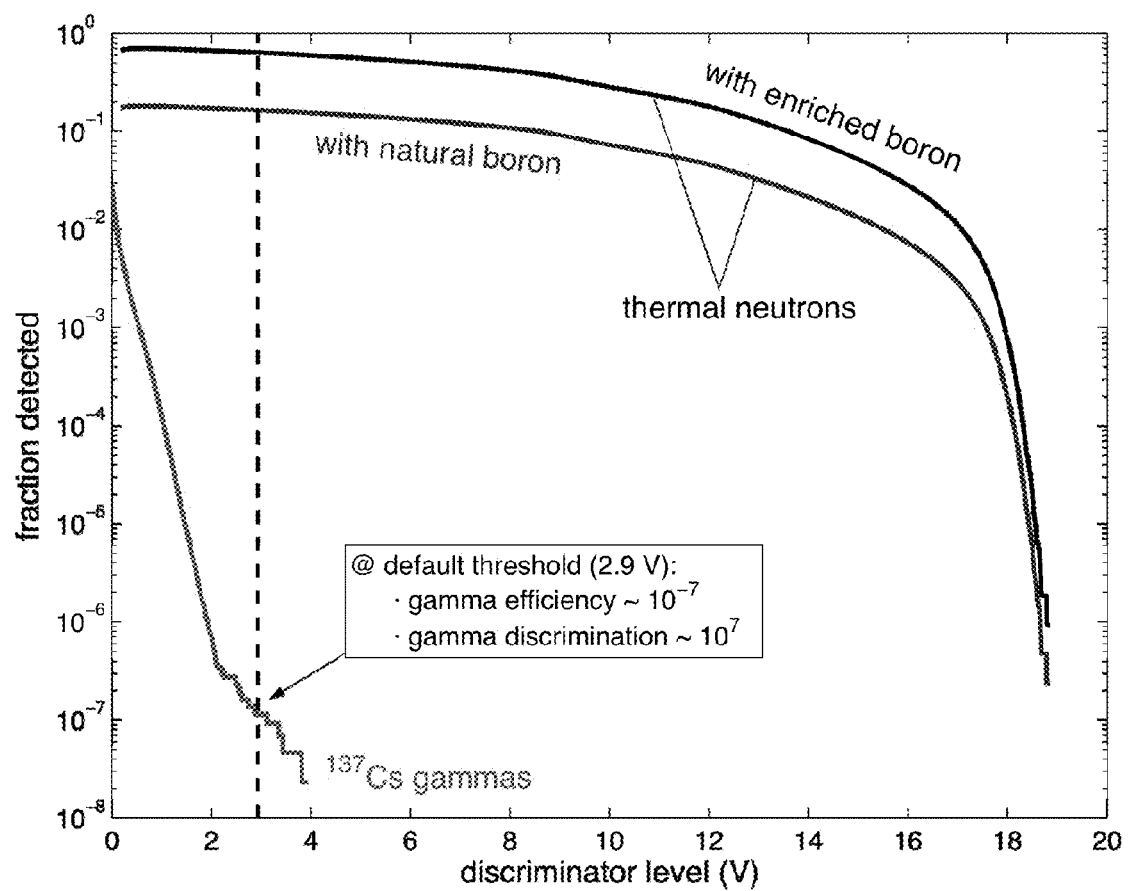
FIG. 4 is a graph of the fraction of both neutron and gamma events detected (efficiency) as a function of the discriminator level (threshold) for a prototype monitor.

The gamma discrimination factor was found to be $10^7$ in the small-scale prototype. The graph of FIG. 4 shows the fraction of both neutron and gamma events detected (efficiency) as a function of the discriminator level (threshold). The variable plotted on the y-axis is the absolute detection efficiency to neutrons and gammas. When counting neutrons, the threshold is set to 2.9 V, as indicated in the figure. At this level, the gamma ray efficiency is about $10^{-7}$.

Several performance parameters of the small-scale prototype monitor, previously published in "High sensitivity portable neutron detector for fissile material detection," *IEEE Nuclear Science Symposium Conference Record*, vol. 2, pp. 1009-1013, 2005, are listed in Table I.

TABLE I

SMALL-SCALE PROTOTYPE DETECTOR PERFORMANCE

| | |
|---|---|
| Effective dimensions | 40 cm × 5 cm × 5 cm |
| Number of 40-cm straws | 136 |
| Weight (incl. housing, shield) | 3.7 kg |
| Neutrons | |
| Background rate | 0.03 cps |
| Sensitivity (thermal) | 36 cps/nv |
| Detection efficiency (thermal) | 18% |
| Gammas | |
| Background rate | 20-25 cps |
| Sensitivity (662 keV) | 251 cpm/(μrem/hr) |
| Detection efficiency (662 keV) | 2.7% |

The neutron and gamma detection and localization methods were tested in laboratory experiments, with the prototype monitor mounted on a portable cart with motorized 360-degree rotation. A 1-mCi $^{65}$Zn gamma ray source was used, hidden in various locations inside the laboratory area. The source was positioned at various distances away from the detector, and at different direction angles, behind walls and laboratory furniture or equipment. A 0.37 μg $^{252}$Cf neutron source, equivalent to 0.94 kg of $^{240}$Pu was used in additional experiments following the same design. In order to achieve neutron thermalization, the source was placed inside a polyethylene cylinder with a 10 cm diameter. As the detector was rotated at a rate of 1 rpm, the count rate was recorded and binned into 1-second long measurements, corresponding to 60 distinct angle steps. Measurements were carried out for several minutes, then the collected data were processed with the algorithm.

Figure 5:
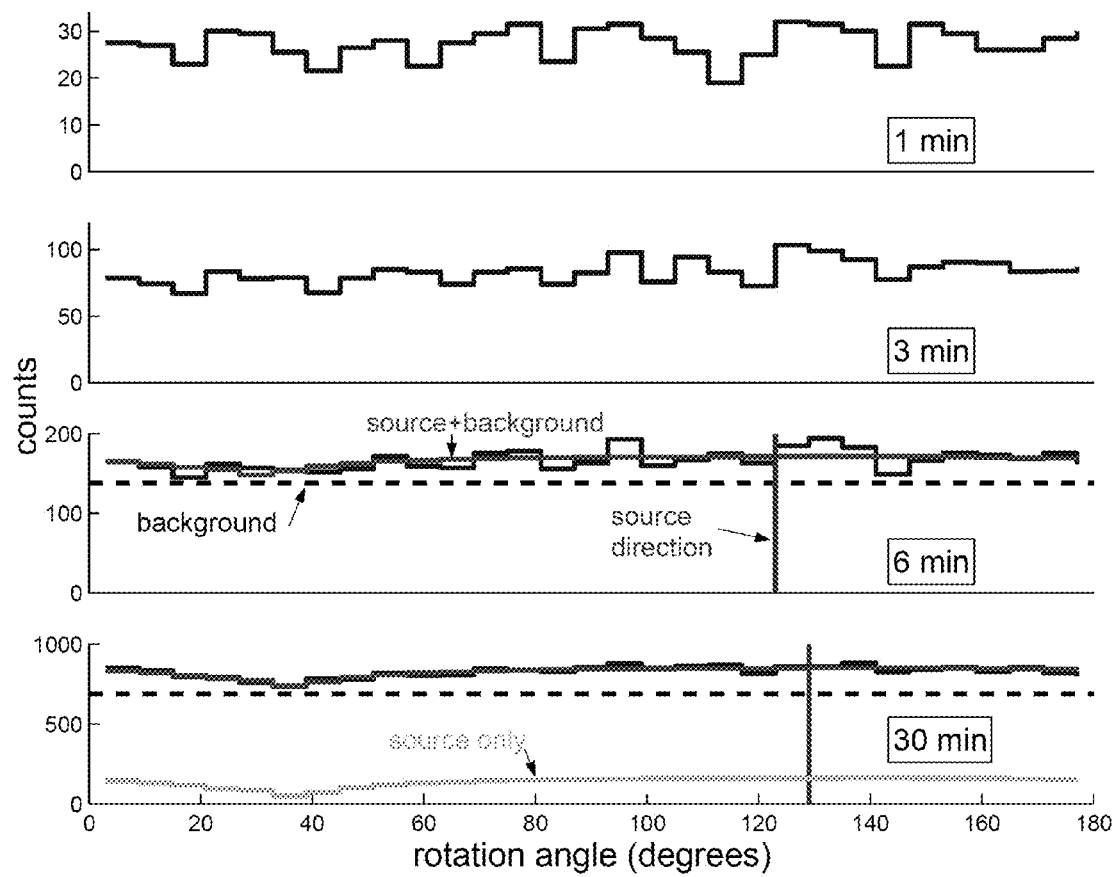
FIG. 5 is a graph of the cumulative counts that the prototype monitor registered over time using a method according to the present invention in an experiment involving a 1 mCi $^{65}$Zn source located 15.8 m away.

FIG. 5 shows the cumulative counts that the monitor registered over time, in an experiment involving a 1 mCi $^{65}$Zn source located 15.8 m away. This signal was processed by the algorithm of the present invention to deduce the presence or absence of a radioactive source, calculate its net signal and direction, and the background rate. In this case, a detection was declared after 6 minutes, with a net source signal of 4.8±7.5 cps and a direction of 123±51 degrees. The false alarm probability was set to 1 false alarm every 10 hours, and the true positive probability was set to 90%. The underlying background was found to be 23±7.6 cps. After accumulating counts over a period of 30 minutes, the source rate changed to 4.6±1.2 cps, the direction to 129±3.6 degrees, and the background to 23±1.2 cps.

Figure 6:
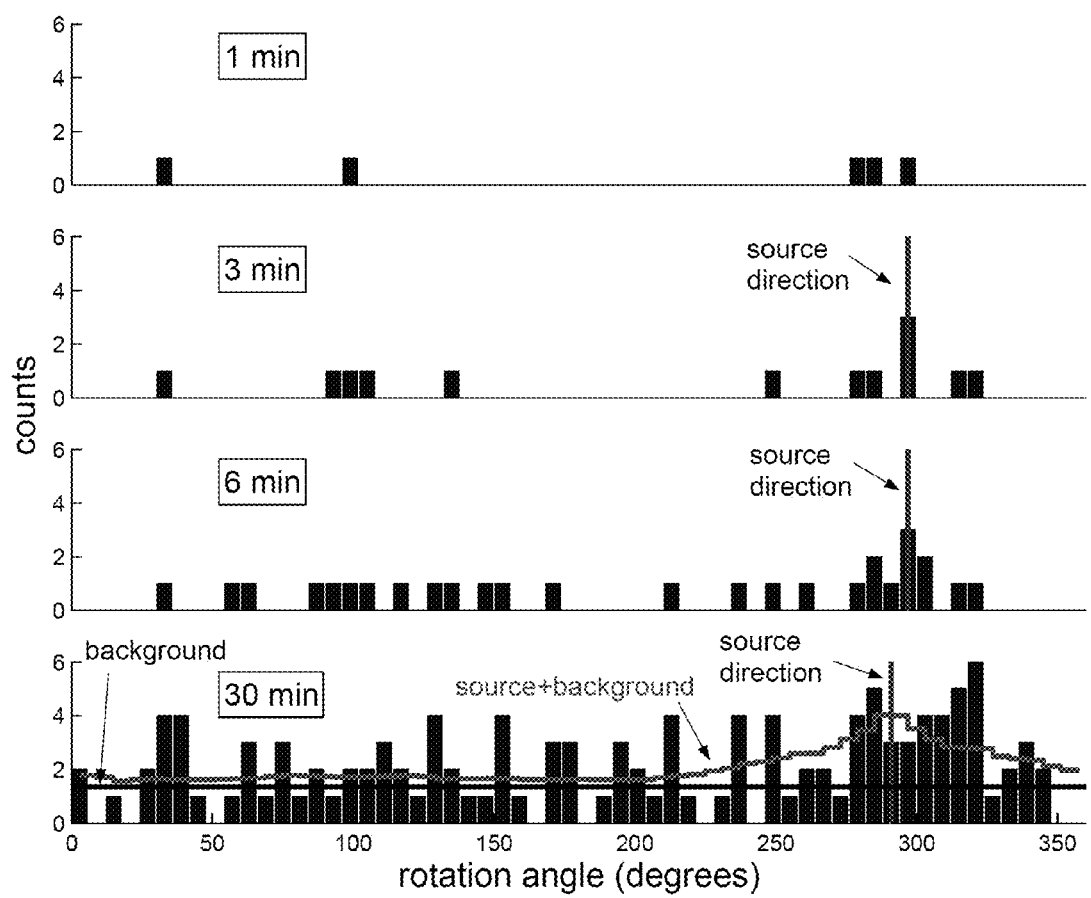
FIG. 6 is a graph of the cumulative counts that the prototype monitor registered over time using a method according to the present invention in an experiment involving a 0.37 μg $^{252}$Cf neutron source, located 10.2 m away.

A similar experiment involved a 0.37 μg $^{252}$Cf neutron source, located 10.2 m away. FIG. 6 shows the cumulative counts. A detection was declared after 3 minutes, with a net source signal of 4.3±1.3 cpm and a direction of 297±19 degrees. The underlying background was 0.022±1.3 cpm. The false alarm probability was set to 1 false alarm every 10 hours, and the true positive probability was set to 90%, as before. For these settings, the detection threshold was 3.8 cpm. After accumulating counts over a period of 30 minutes, the source rate was found to be 1.5±0.80 cpm, the direction was 291±18 degrees, and the background was 2.6±0.81 cpm.

FIGS. 5 and 6 illustrate how a method of the present invention makes successful detections even when a source is not evident in the count rate data.

The performance of the full-scale panel detector was determined in computer simulations, combined with extrapolations of the performance of the small-scale prototype. Table II summarizes the results.

TABLE II

ESTIMATED PERFORMANCE OF PROPOSED DETECTOR

| | |
|---|---|
| Effective dimensions | 100 cm × 100 cm × 1.7 cm |
| Number of 1-m long straws | 25 × 50 |
| Weight | 38 kg |
| Neutrons | |
| Background rate | 0.3 cps |
| Sensitivity (thermal) | 3700 cps/nv |
| Detection efficiency (thermal) | 37% |
| Gamma discrimination | 10$^7$ |
| Gammas | |
| Background rate | 600 cps |
| Sensitivity (662 keV) | 7500 cpm/(μrem/hr) |
| Detection efficiency (662 keV) | 1.8% |

The thermal neutron sensitivity of the detector, assuming it incorporates enriched boron, is about 3700 cps/nv, corresponding to a detection efficiency of about 37% (sensitive area of 10,000 cm$^2$). The $^{137}$Cs gamma ray sensitivity is about 7500 cpm/(μrem/hr), corresponding to a detection efficiency of about 1.8%. Based on extrapolation of the small-scale prototype, the natural background count rate is 0.3 cps for neutrons, and 600 cps for gammas.

Figure 7:
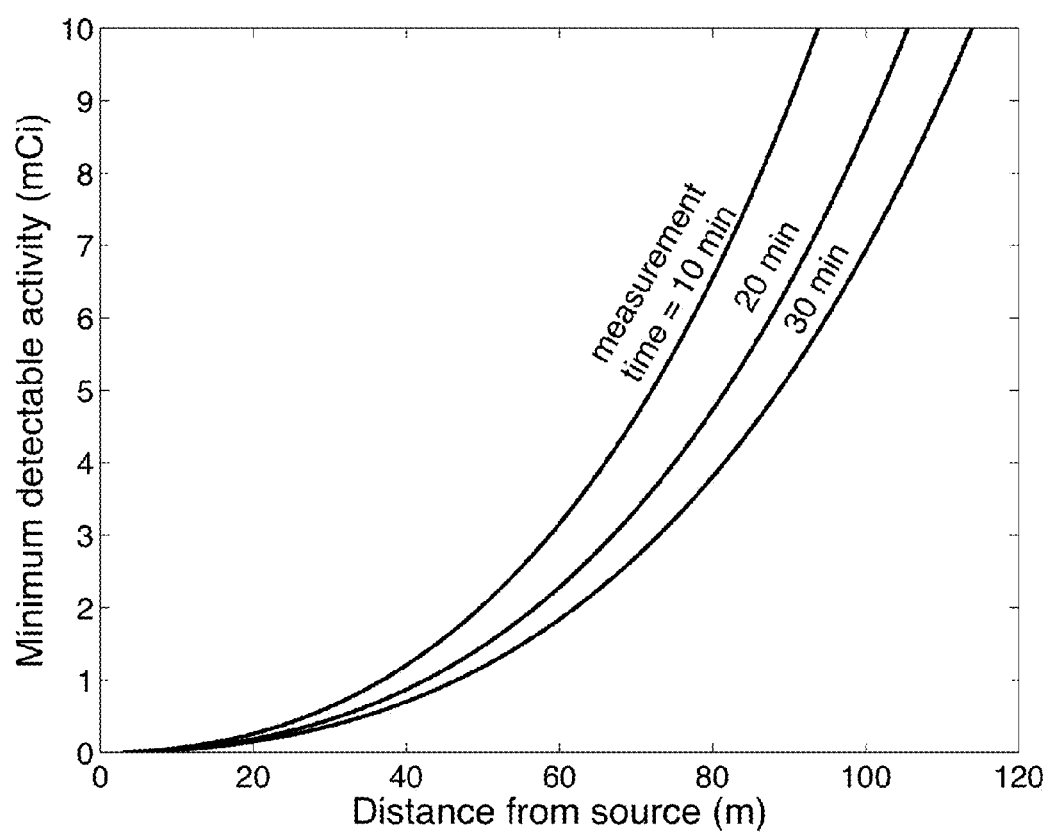
FIG. 7 is a graph of minimum activity of a gamma point source that can be detected with a true positive probability of 0.99, as a function of distance from the full-scale rotating monitor.

FIG. 7 shows the minimum activity of a gamma point source that can be detected with true positive probability of 0.99, as a function of distance from the rotating detector. The measurement times are indicated next to each curve. The false alarm rate was set to 1 false alarm every 100 hours in all cases. The background rate was assumed to be 600 cps in all cases.

The curves account for the attenuation of gammas in air. The relationship between the minimum detectable activity A and the distance d between the source and the detector was evaluated as:

$$A = f_{air} \cdot (MDS/So) \cdot (d/do)^2 \cdot Ao$$

where So is the signal measured with the detector using a source of activity Ao at a distance do, $f_{air}$ is a correction factor for the attenuation of gammas in air (evaluated in MCNP5), and MDS is the minimum detectable signal that can be detected with a 0.99 probability and at the specified false alarm rate and measurement time.

Figure 8:
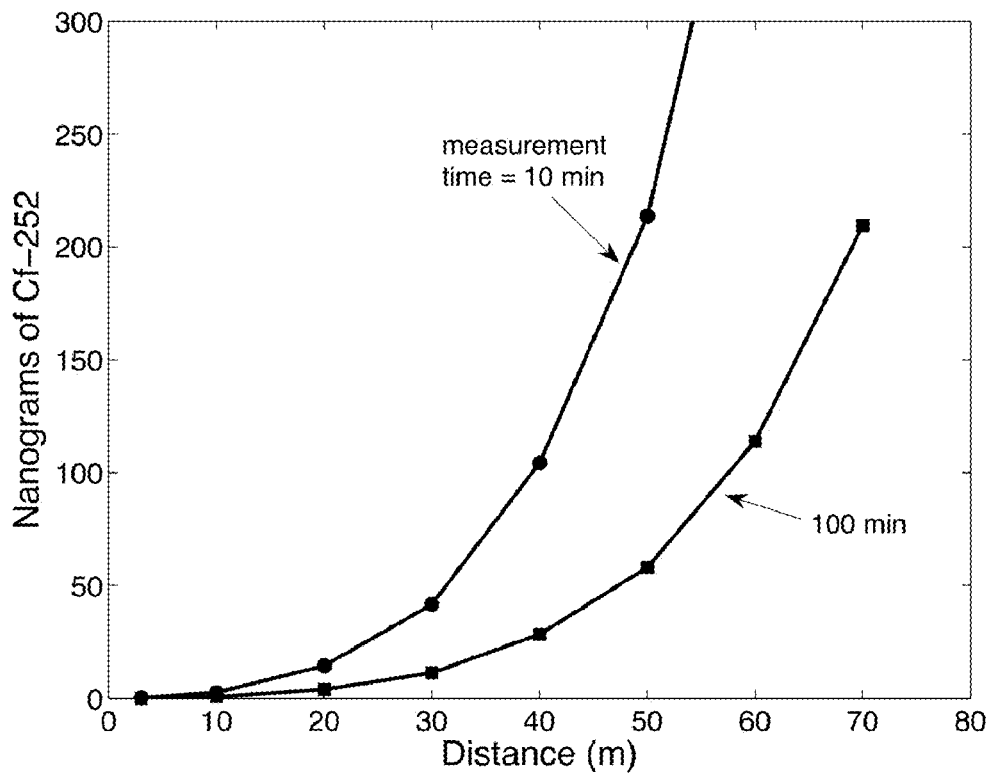
FIG. 8 is a similar plot to FIG. 5 and characterizes neutron detection limits of a rotating monitor in accord with the present invention.
Figure 8A:
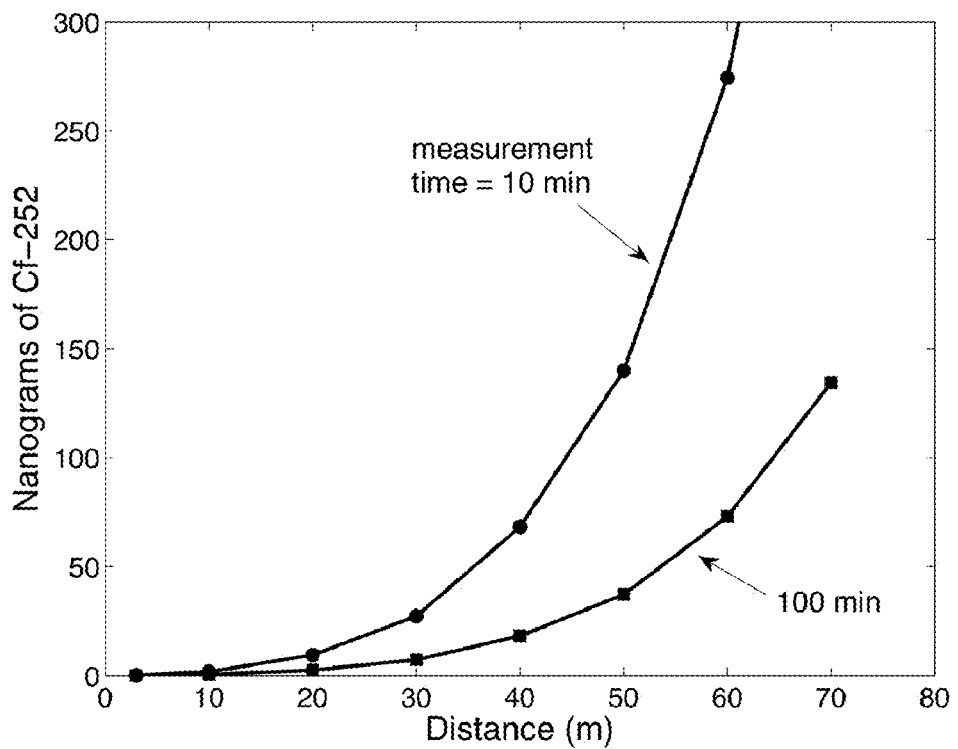
FIG. 8a is a similar plot to FIG. 8 and characterizes neutron detection limits of a fixed orientation monitor in accord with the present invention.

A similar plot has been constructed that characterizes the neutron detection limits of the proposed monitor. FIG. 8 shows the minimum amount of $^{252}$Cf that can be detected versus distance, assuming a 20% thermalization at or near the source, a false alarm rate of 1 false alarm per 1000 hours, and a true positive probability of 0.99. Neutron thermalization and attenuation in air and ground was accounted for. The ground was assumed to be made of concrete. The background rate was assumed to be 0.3 cps. It can be seen for example that a circular area with a diameter of 100 meters (an area of 7850 m$^2$) can be screened for the presence of 210 ng or more of $^{252}$Cf in less than 10 minutes. In an alternative detection mode in which a suspected source direction is known so that the detector angle can be fixed, a smaller, 140 ng source can be detected from the same distance (50 m) in 10 minutes, as show in FIG. 8a.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

I claim:

1. A method of detecting radiation comprising the steps of:
   (a) providing a panel monitor comprising a plurality of detector modules stacked vertically, each detector module comprising a sealed detector core comprising an array of thin walled tubes lined with an enriched boron coating;
   (b) rotating the panel monitor around a vertical axis;
   (c) recording gamma and/or neutron counts at intervals while the panel rotates;
   (d) processing information regarding the counts and rotation angle of the panel monitor using an algorithm to deduce a radiation source size and direction.

2. The method of claim 1, wherein the panel monitor rotated about the axis at up to 5 revolutions per minute.

3. The method of claim 1, wherein the panel monitor rotated about the axis at about one revolutions per minute.

4. The method of claim 1, wherein the gamma ray counts are recorded at between about 0.1 and 10 second intervals.

5. The method of claim 1, wherein the gamma ray counts are recorded at about one second intervals.

6. The method of claim 1, wherein the neutron counts are recorded at between about 0.1 and 10 second intervals.

7. The method of claim 1, wherein the neutron counts are recorded at about one second intervals.

8. The method of claim 1, wherein the panel monitor is rotated about a vertical axis proximate to the center of the panel monitor.

9. The method of claim 1, wherein said detector modules further comprise:
   a neutron collimator; and
   a housing for said sealed detector core and collimator.

10. A method of detecting radiation comprising the steps of:
    (a) providing a panel monitor comprising a plurality of detector modules stacked vertically;
    (b) rotating the panel monitor around a vertical axis;
    (c) recording gamma and/or neutron counts at intervals while the panel rotates;
    (d) processing information regarding the counts and rotation angle using an algorithm to deduce a radiation source size and direction, wherein the algorithm used for gamma rays comprises:
       (1) recording the monitor rotation angle $\theta_i$, and gamma count rate $y_i$, at time $t_i$, with i taking integer values from 1 to N, where N is the desired number of measurements over the course of a single rotation;
       (2) finding parameters a and b that minimize the function $\chi^2 = \Sigma(y_i - f_i(\theta_i, a, b))^2 / y_i$, where $f_i$ is an analytical expression such that $f_i = a \cdot yt_i / \Sigma(yt_i) + (\Sigma(y_i) - a) \cdot (1/30)$, and where $yt_i = yt_i(\theta_i + b)$ is the known net angular response of the detector, for each angle $\theta_i + b$; and
       (3) once $a_0$ and $b_0$ for which $\chi^2(a_0, b_0) = \min(\chi^2)$ are obtained, computing the following quantities:
          the net signal (averaged over all angles) as $a_0/30$;
          the background rate as $(\Sigma(y_i) - a_0)/30$;
          and the source direction angle as $b_0$.

11. A method of detecting radiation comprising the steps of:
    (a) providing a panel monitor comprising a plurality of detector modules stacked vertically;
    (b) rotating the panel monitor around a vertical axis;
    (c) recording gamma and/or neutron counts at intervals while the panel rotates;
    (d) processing information regarding the counts and rotation angle using an algorithm to deduce a radiation source size and direction, wherein the algorithm used for neutrons comprises:
       (1) recording the monitor rotation angle $\theta_i$, and neutron count rate $y_i$, at time $t_i$, with i taking integer values from 1 to N, where N is the desired number of measurements over the course of a single rotation;
       (2) finding parameters a and b that minimize the function $-\ln(L) = -\ln(\Pi\ e^{-f_i} \cdot f_i^{y_i} / y_i!)$, where $f_i$ is an analytical expression such that $f_i = a \cdot yt_i / \Sigma(yt_i) + (\Sigma(y_i) - a) \cdot (1/30)$, and where $yt_i = yt_i(\theta_i + b)$ is the known net angular response of the detector, for each angle $\theta_i + b$; and
       (3) once $a_0$ and $b_0$ for which $-\ln(L)(a_0, b_0) = \min(-\ln(L))$ are obtained, computing the following quantities:
          the net signal (averaged over all angles) as $a_0/30$;
          the background rate as $(\Sigma(y_i) - a_0)/30$;
          and the source direction angle as $b_0$.

12. A method of detecting radiation comprising the steps of:
    (a) providing a panel monitor comprising a plurality of detector modules stacked vertically, the detector module comprising a close-packed array of small-diameter, thin walled tubes;
    (b) rotating the panel monitor around a vertical axis at between about 0.01 and 5 revolutions per minute;
    (c) recording gamma and/or neutron counts at between about 0.1 and 10 second intervals while the panel rotates;
    (d) processing information regarding the counts and rotation angle using an algorithm to deduce a radiation source size and direction, wherein information regarding neutron counts is processed using the following algorithm:
       (i) recording the monitor rotation angle $\theta_i$, and neutron count rate $y_i$, at time $t_i$, with i taking integer values from 1 to N, where N is the number of measurements over the course of a single rotation,
       (ii) finding parameters a and b that minimize the function $-\ln(L) = -\ln(\Pi\ e^{-f_i} \cdot f_i^{y_i} / y_i!)$, where $f_i$ is an analytical expression such that $f_i = a \cdot yt_i / \Sigma(yt_i) + (\Sigma(y_i) - a) \cdot (1/30)$, and where $yt_i = yt_i(\theta_i + b)$ is the known net angular response of the detector, for each angle $\theta_i + b$, and
       (iii) once $a_0$ and $b_0$ for which $-\ln(L)(a_0, b_0) = \min(-\ln(L))$ are obtained, computing the following quantities:
          the net signal (averaged over all angles) as $a_0/30$;
          the background rate as $(\Sigma(y_i) - a_0)/30$;
          and the source direction angle as $b_0$;
    and information regarding gamma ray counts is processed using the following algorithm:
       (i) recording the monitor rotation angle $\theta_i$, and gamma count rate $y_i$, at time $t_i$, with i taking integer values from 1 to N, where N is the number of measurements over the course of a single rotation,
       (ii) finding parameters a and b that minimize the function $\chi^2 = \Sigma(y_i - f_i(\theta_i, a, b))^2 / y_i$, where fi is an analytical expression such that $f_i = a \cdot yt_i / \Sigma(yt_i) + (\Sigma(y_i) - a) \cdot (1/30)$, and where $yt_i = yt_i(\theta_i + b)$ is the known net angular response of the detector, for each angle $\theta_i + b$, and
       (iii) once $a_0$ and $b_0$ for which $\chi^2(a_0, b_0) = \min(\chi^2)$ are obtained, computing the following quantities:
          the net signal (averaged over all angles) as $a_0/30$;
          the background rate as $(\Sigma(y_i) - a_0)/30$;
          and the source direction angle as $b_0$.

13. An apparatus for detection for radiation, comprising:
a panel monitor;
    said panel monitor comprising a plurality of detector modules stacked vertically, wherein said detector modules comprise sealed detector cores, the detector cores comprising arrays of thin walled tubes lined with an enriched boron coating, and
    said panel monitor being rotatable about a vertical axis while radiation is being detected, to increase detection sensitivity as compared to non-rotating panel monitors.

14. The apparatus of claim 13, wherein said panel monitor rotates about a vertical axis proximate to its center.

15. The apparatus of claim 13, wherein said panel monitor is rotatable about the axis at between about 0.01 and 5 revolutions per minute.

16. The apparatus of claim 13, wherein said panel monitor is rotatable about the axis at about 1 revolutions per minute.

17. The apparatus of claim 13, wherein said detector modules further comprise:
a neutron collimator; and
a housing for said sealed detector core and collimator.

18. The apparatus of claim 13, further comprising:
a preamplifier circuit of a type known as the charge-sensitive configuration;
an analogue shaper;
a discriminator;
and a digital counter.

19. The apparatus of claim 13, further comprising a processor for processing count and panel monitor rotation angle information using a predetermined algorithm.

20. An apparatus for detection for radiation, comprising:
a panel monitor; said panel monitor comprising a plurality of detector modules stacked vertically and said panel monitor being rotatable about a vertical axis; and
a processor for processing the count information using a predetermined algorithm, wherein the algorithm used for processing information about gamma rays comprises:
(a) recording the monitor rotation angle $\theta_i$, and gamma count rate $y_i$, at time $t_i$, with i taking integer values from 1 to N, where N is the desired number of measurements over the course of a single rotation;
(b) finding parameters a and b that minimize the function $\chi^2 = \Sigma(y_i - f_i(\theta_i, a, b))^2/y_i$, where fi is an analytical expression such that $f_i = a \cdot yt_i/\Sigma(yt_i) + (\Sigma(y_i) - a) \cdot (1/30)$, and where $yt_i = yt_i(\theta_i + b)$ is the known net angular response of the detector, for each angle $\theta_i + b$; and
(c) once $a_0$ and $b_0$ for which $\chi^2(a_0, b_0) = \min(\chi^2)$ are obtained, computing the following quantities:
the net signal (averaged over all angles) as $a_0/30$;
the background rate as $(\Sigma(y_i) - a_0)/30$;
and the source direction angle as $b_0$.

21. An apparatus for detection for radiation, comprising:
a panel monitor; said panel monitor comprising a plurality of detector modules stacked vertically and said panel monitor being rotatable about a vertical axis; and
a processor for processing the count information using a predetermined algorithm, wherein the algorithm used for processing information about neutrons comprises:
(a) recording the monitor rotation angle $\theta_i$, and neutron count rate $y_i$, at time $t_i$, with i taking integer values from 1 to N, where N is the desired number of measurements over the course of a single rotation;
(b) finding parameters a and b that minimize the function $-\ln(L) = -\ln(\Pi\, e^{-f_i} \cdot f_i^{y_i}/y_i!)$, where $f_i$ is an analytical expression such that $f_i = a \cdot yt_i/\Sigma(yt_i) + (\Sigma(y_i) - a) \cdot (1/30)$, and where $yt_i = yt_i(\theta_i + b)$ is the known net angular response of the detector, for each angle $\theta_i + b$; and
(c) once $a_0$ and $b_0$ for which $-\ln(L)(a_0, b_0) = \min(-\ln(L))$ are obtained, computing the following quantities:
the net signal (averaged over all angles) as $a_0/30$;
the background rate as $(\Sigma(y_i) - a_0)/30$;
and the source direction angle as $b_0$.

* * * * *